(12) United States Patent
Novy

(10) Patent No.: US 12,086,573 B2
(45) Date of Patent: *Sep. 10, 2024

(54) AUTOMATIC CONTAINERIZATION OF OPERATING SYSTEM DISTRIBUTIONS

(71) Applicant: Red Hat, Inc., Raleigh, NC (US)

(72) Inventor: Jindrich Novy, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/379,810

(22) Filed: Jul. 19, 2021

(65) Prior Publication Data

US 2021/0349699 A1    Nov. 11, 2021

Related U.S. Application Data

(63) Continuation of application No. 16/791,569, filed on Feb. 14, 2020, now Pat. No. 11,093,221.

(51) Int. Cl.
G06F 8/36    (2018.01)

(52) U.S. Cl.
CPC ..................................... *G06F 8/36* (2013.01)

(58) Field of Classification Search
None
See application file for complete search history.

(56) References Cited

U.S. PATENT DOCUMENTS

| | | | |
|---|---|---|---|
| 6,240,550 B1 * | 5/2001 | Nathan | G06F 8/65 717/169 |
| 10,073,974 B2 * | 9/2018 | Hwang | G06F 8/71 |
| 2001/0027464 A1 * | 10/2001 | Tavoletti | G06F 9/4843 719/310 |
| 2005/0187894 A1 * | 8/2005 | Pletcher | G06F 8/71 |
| 2015/0128105 A1 * | 5/2015 | Sethi | G06F 8/36 717/121 |
| 2016/0162339 A1 * | 6/2016 | Ghosh | G06F 9/4887 718/105 |
| 2016/0350081 A1 * | 12/2016 | Kumar | G06F 8/30 |
| 2017/0322824 A1 * | 11/2017 | Reuther | G06F 3/0632 |
| 2018/0114034 A1 * | 4/2018 | Brady | G06F 9/455 |
| 2018/0165133 A1 * | 6/2018 | Iyigun | H04L 65/40 |
| 2020/0410106 A1 * | 12/2020 | Nadgowda | G06F 21/566 |

FOREIGN PATENT DOCUMENTS

GB    2524798 A  * 10/2015  .......... G06F 11/3664

OTHER PUBLICATIONS

Wilder, "Jason Wilder's Blog", 2014, Jason Wilder (Year: 2014).*
Docker-Storage, About Storage Drivers, 2019, Docker (Year: 2019).*
Docker-Registry, "Docker Registry", 2019, Docker (Year: 2019).*
Weber, "Idiomatic and Reproducible Software Builds using Containers for Reliable Computing", 2016, arXiv (Year: 2016).*

(Continued)

*Primary Examiner* — Hossain M Morshed

(74) *Attorney, Agent, or Firm* — Womble Bond Dickinson (US) LLP

(57) ABSTRACT

Embodiments of the present disclosure relate to containerizing the packages of an operating system. More specifically, a dependency level of each of a plurality of packages included in an operating system may be determined and a container is generated in view of the dependency level.

18 Claims, 8 Drawing Sheets

(56) References Cited

OTHER PUBLICATIONS

Weber, "Idiomatic and Reproducible Software Builds using Containers for Reliable Computing", 2017, arXiv: 1702.02999v1 (Year: 2017).*

Saleh A. Almugrin, "Definitions and Validations of Metrics of Indirect Package Coupling in an Agile, Object-Oriented Enviornment", Aug. 2015, pp. 1-190, Kent State University.

Jindrich Novy, Ph.D, "Building Containers in Buildah/Podman", Why kickstart is not good for containers, pp. 1-18, Redhat presentation.

Docker, "Best practices for writing Dockerfiles", 2019, Docket at https://docs.docker.com/develop/develop-images/dockerfile_best-practices/ (Year: 2019).

* cited by examiner

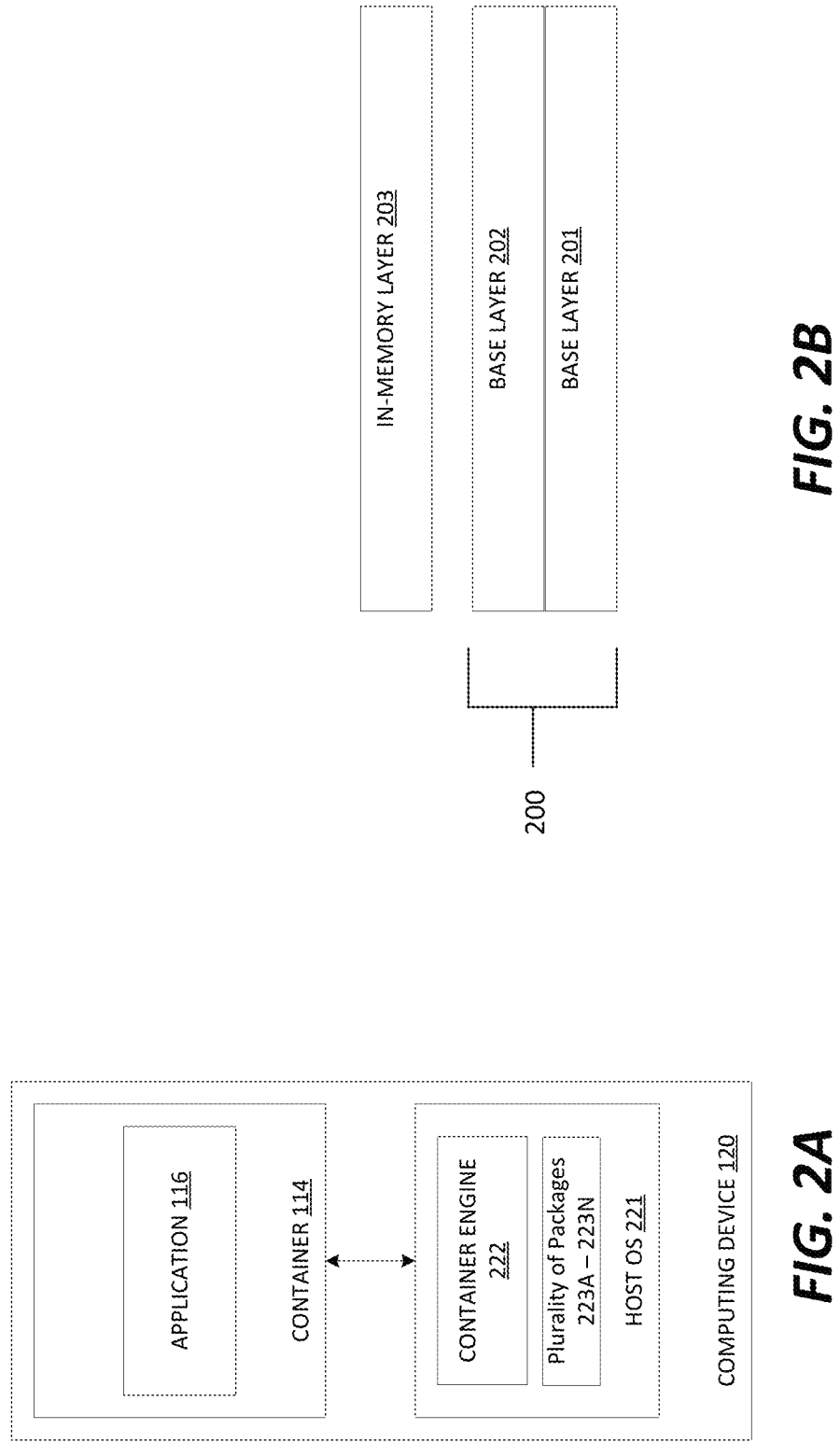

| # of Packages Dependent | Package |
|---|---|
| 14713 | glibc |
| 5537 | bash |
| 4913 | libstdc++ |
| 3927 | Javapackages-tools |
| 3784 | perl-libs |
| 3450 | python2 |
| 3257 | python3 |
| 3251 | Textlive-base |
| 2219 | zlib |

AUTOMATIC CONTAINERIZATION OF OPERATING SYSTEM DISTRIBUTIONS

RELATED APPLICATIONS

This application is a continuation of U.S. patent application Ser. No. 16/791,569, filed Feb. 14, 2020, which is herein incorporated by reference in its entirety.

TECHNICAL FIELD

Aspects of the present disclosure relate to containers, and more particularly, to containerization of the packages utilized by an operating system to run various applications.

BACKGROUND

Containers are active components executing on an operating system that provide an environment for applications to run, while being isolated from any other components of a host machine, network, or data center etc. Multiple containers may execute on a single operating system kernel and share the resources of the hardware the operating system is running on. All of the files, libraries and dependencies necessary to run applications in a container may be provided by an image file(s). An image file may be comprised of a set of base layers that define the runtime environment, as well as the packages and utilities necessary for a containerized application to run. A container may include the base layers from an image file as well as an in-memory layer in which the containerized application may write/modify data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2A is a block diagram that illustrates an example container executing within a computing device, in accordance with some embodiments of the present disclosure.

FIG. 2B is a block diagram that illustrates an image file and the in-memory layer of a container, in accordance with some embodiments of the present disclosure.

DETAILED DESCRIPTION

Figure 1A:
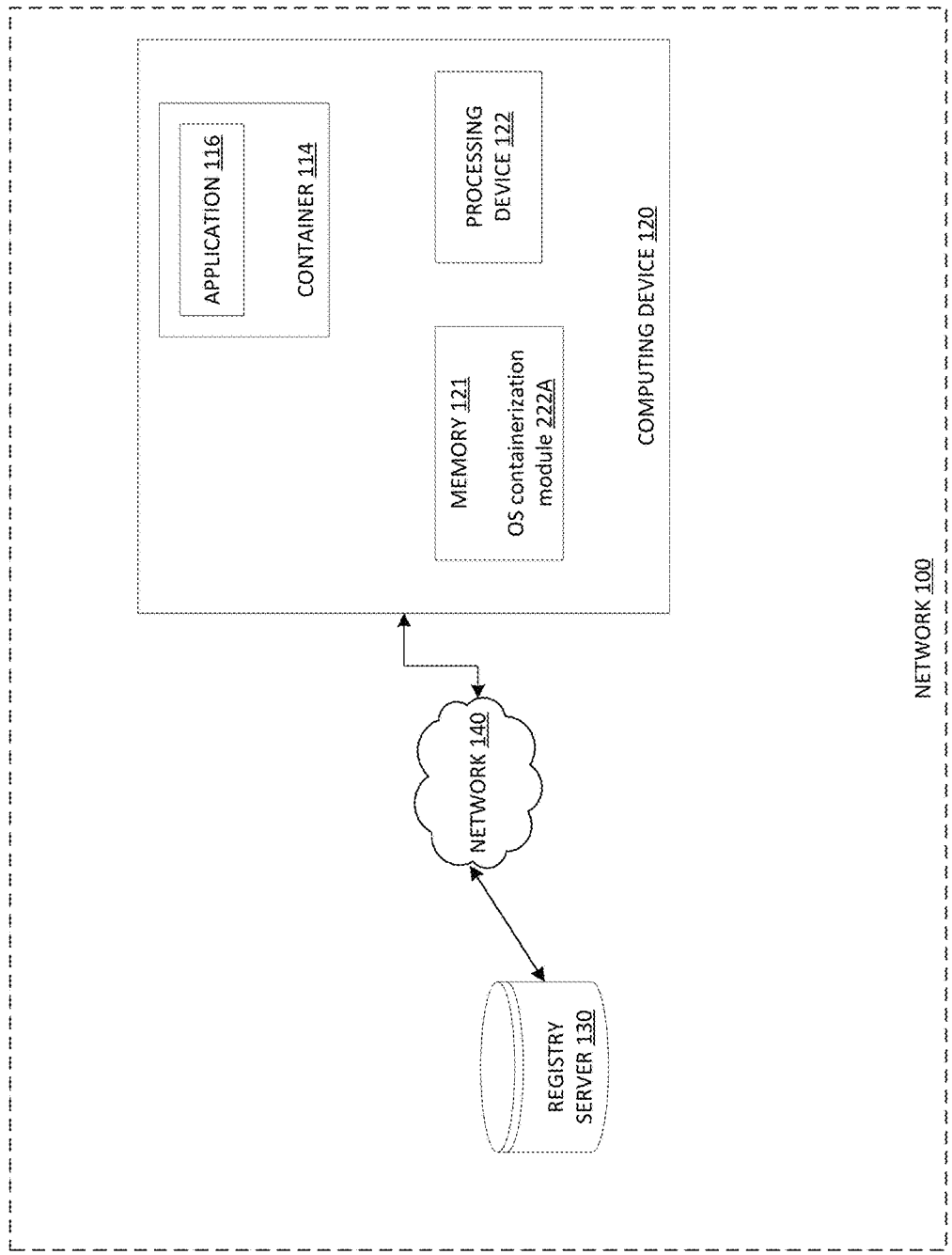
FIG. 1A is a block diagram that illustrates an example network, in accordance with some embodiments of the present disclosure.

Many current tools for creating containers operate by stacking layers on top of each other to build an image file which may be used to create a container in which an application may run. Certain layers of an image file may correspond to various packages and libraries required to run the application. The layers in an image file can be freely defined by a user or definition of the layers can be automated by software, for example. Traditionally, applications are delivered via the use of multiple operating system packages which are often shared among different applications. However, there is currently no defined mechanism for defining layers of an entire operating system and application ecosystem. This is particularly problematic for more complex applications.

Utilizing an entire operating system and any associated packages as a single layer in an image file can render the size of an application container large, especially for larger, more complex applications. In addition, if an entire operating system and any associated packages are containerized within a single layer of an image file, security remediation of impactful operating system components is difficult, since security vulnerabilities in one package of the operating system may require the entire operating system layer to be rebuilt. In addition, current dependency solvers only provide a single satisfactory solution, and thus it is nearly impossible to implement a solution metric (e.g., size) using such solvers due to the computation complexity and extensive memory requirements.

The present disclosure addresses the above-noted and other deficiencies by using a processing device to determine a dependency level of each of a plurality of packages utilized by an operating system. The dependency level of a particular package may be defined as the number of packages that depend on that particular package. The processing device may sort the plurality of packages based on their dependency level, and create an image file for each of the plurality of packages sequentially, based on the dependency level of each of the plurality of packages. The processing device may then upload the image file for each of the plurality of packages to a registry server. In response to a request to generate a container on which to run an application, the processing device may determine one or more of the plurality of packages that the application is dependent on and retrieve from the registry server, a corresponding image file for each of the one or more packages that the application is dependent on. The processing device may layer the one or more of the plurality of image files successively based on the dependency levels of the corresponding one or more packages that the application is dependent on to generate an application image file. In this way, image files corresponding to packages that are most frequently pulled via dependencies (e.g., because they are the most depended on/have the highest dependency level) are stored in lower level layers of application image files. This results in a reduction in the overall container size required for large applications (since most of the lower level image files are shared). This also allows security vulnerabilities in certain image files to be fixed more easily as there is a single point of failure. The top layer of the application image file may comprise the application itself. The application image file may be used to create a container within which the application may run.

FIG. 1A is a block diagram that illustrates an example network 100. As illustrated in FIG. 1A, the network 100 includes a computing device 120, a registry server 130 and a network 140. The computing device 120 and the registry server 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and registry server 130. The computing device 120 and registry server 130 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 120 and registry server 130 may comprise any suitable type of computing device or machine that has a programmable processor including, for example, server computers, desktop computers, laptop computers, tablet computers, smartphones, set-top boxes, etc. In some examples, the computing device 120 and registry server 130 may comprise a single machine or may include multiple interconnected machines (e.g., multiple servers configured in a cluster). The computing device 120 and registry server 130 may be implemented by a common entity/organization or may be implemented by different entities/organizations. For example, computing device 120 may be operated by a first company/corporation and registry server 130 may be operated by a second company/corporation. The computing device 120 and registry server 130 may execute or include an operating system (OS), as discussed in more detail below. The OS of computing device 120 and registry server 130 may manage the execution of other components (e.g., software, applications, etc.) and/or may manage access to the hardware (e.g., processors, memory, storage devices etc.) of the computing device.

Figure 1B:
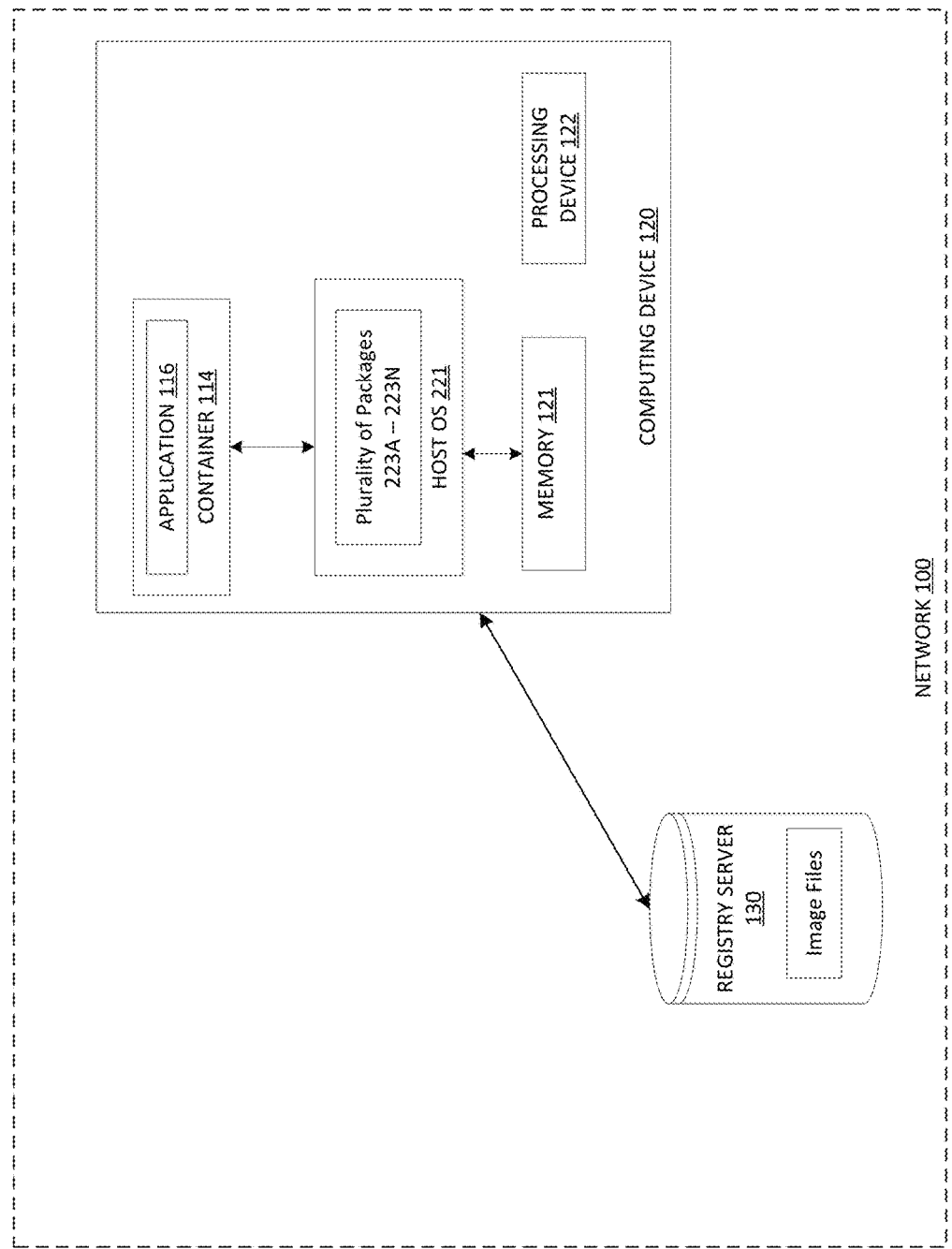
FIG. 1B is a block diagram that illustrates an example network, in accordance with some embodiments of the present disclosure.

As illustrated in both FIGS. 1A and 1B, computing device 120 may include a container 114. In some embodiments, the container 114 may execute on a container engine (shown in FIG. 2A) which executes on top of the host OS 221 (shown in FIG. 2A) of computing device 120, as discussed in more detail below. The container engine may allow different containers to share the host OS 221 (e.g., the OS kernel, packages, binaries, libraries thereof etc.), as discussed in more detail below. The container engine may also perform other functions, as discussed in more detail below. The container 114 may be isolated, in that it is not connected to any other device or component of network 100, whether virtual or otherwise. Container 114 may execute application 116. In some embodiments, application 116 may be any application which requires packages to facilitate its operation. Registry server 130 may be a registry server which may store image files (e.g., docker images), as discussed in further detail herein.

FIG. 1B illustrates a detailed version of the network 100 of FIG. 1A. As illustrated in FIG. 1B, computing device 120 may include processing device 122 and memory 121 which may be physical resources that container 114 may utilize, as discussed in further detail herein.

FIG. 2A is a block diagram that illustrates the container 114 of FIGS. 1A and 1B executing within computing device 120, in accordance with some embodiments of the present disclosure. As discussed above, the container 114 may execute on computing device 120. In one embodiment, the container 114 may be an isolated set of resources allocated to executing an application, software, and/or process independent from other applications, software, and/or processes. The host OS 221 may use namespaces to isolate the resources of containers from each other. In another embodiment, the container 114 may be a virtualized object similar to a virtual machine. However, container 114 may not implement a separate guest OS. The container 114 may share the OS kernel and packages (e.g., libraries, binary files and source files) of the host OS 221 with other containers (not shown) that are executing on the computing device 120. Although FIG. 2A illustrates one container 114, the computing device 120 may include multiple containers in other embodiments. Each container may have one or more respective file systems, memories, devices, network ports, etc., for accessing the physical resources of the computing device 120 (e.g., processing device 122 and memory 121, shown in FIG. 1B).

In some embodiments, the container engine 222 may allow different containers to share the host OS 221 (including e.g., the OS kernel as well as packages including any associated libraries, binary and/or source files etc.) of the computing device 120. For example, the container engine 222 may multiplex the packages 223 of the host OS 221 between multiple containers as discussed in further detail herein. The container engine 222 may also facilitate interactions between the container 114 and the resources of the computing device 120. For example, the container engine 222 may manage requests from container 114 to access a memory (e.g., a RAM) of the computing device 120. In another example, the container engine 222 may manage requests from the container 114 to access certain packages of the host OS 221. The container engine 222 may also create, remove, and manage containers. In one embodiment, the container engine 222 may be a component of the host operating system 221 (e.g., Red Hat' Enterprise Linux). In another embodiment, container engine 222 may run on top of the host operating system 221, or may run directly on host hardware without the use of a host operating system 221. In yet other embodiments, container engine 222 may be a component of a network virtualization platform (not shown), such as the RedHat™ OpenStack™ platform for example, that runs on host OS 211. Container engine 222 may include software or logic to build a container using e.g., a docker file (to build an image file) or an existing image file. Although FIGS. 1B and 2A show the packages 223 as included within the host OS 221, in some embodiments the packages 223 may be stored separately (e.g., within registry server 130) and accessed by host OS 221 as necessary.

As illustrated in FIG. 2A, application 116 may execute within the container 114. For example, the application 116 may execute within a runtime environment (not shown in the figures) of the container 114. Both the container 114 and the application 116 may be created by the host OS 221 (e.g., via container engine 222). The host OS 221, via the computing device 120 may provide administrators and users with the capability to configure and deploy a variety of applications and/or network functions within containers.

Container engine 222 may provide an image-based deployment module for creating containers and may store one or more image files for creating container instances. In some embodiments, the image files may be stored in registry server 130. Each image file may include a series of layers, which may be combined into a single image as discussed in further detail herein.

Container engine 222 may include a storage driver (not shown), such as OverlayFS, to manage the contents of a container including the read only (e.g., base) and writable (e.g. in-memory) layers of the container. The storage driver may be a type of union file system which allows a developer to overlay one layer on top of another. Changes (e.g., data to be written) may be recorded in the upper-most layer (e.g., the in-memory layer), while the lower layer(s) (e.g., base images) remain unmodified. In this way, multiple containers may share an image file that includes base layers that are read-only.

FIG. 2B illustrates an example image file 200 that the container 114 may be generated from. The image file 200 may be stored by the container engine 222 illustrated in FIG. 2A or registry server 130 illustrated in FIG. 1A. In some embodiments, as illustrated in FIG. 2B, image file 200 may include base layers 201 and 202. Image file 200 may be shared by multiple containers. When the container engine 222 creates a new container, it may add a new writable (e.g., in-memory) layer on top of the underlying base layers. This new writable layer is illustrated as the in-memory layer 203 in FIG. 2B. When the container is deleted, the in-memory layer 203 is also deleted. However, the underlying image file 200 remains unchanged. Although illustrated as having two base layers for simplicity, image file 200 may include any suitable number of base layers. Base layers may define the runtime environment as well as the packages and utilities necessary for a containerized application to run. In the example of FIG. 2B, base layer 201 may comprise the host OS 221 (including e.g., the OS kernel as well as the packages of the host OS 221 including any associated libraries, binary and/or source files etc.), on which the application 116 may run. The base layer 202 may comprise the application itself including any packages and utilities necessary for the application 116 to run. Thus, base layers 201 and 202 may each comprise static snapshots of the container 114's configuration and may be read-only layers that are never modified. Any changes (e.g., data to be written by the application 116) may be implemented in subsequent (upper) layers such as in-memory layer 203. Changes made in the in-memory layer 203 may be saved by creating a new layered image.

As discussed above, the host OS 221 may comprise a plurality of packages 223, each of which may be a program that provides certain functionality (e.g., for executing an application). Although FIG. 2B illustrates the base layer 201 of image file 200 as comprising the host OS 221 (and thus, all of the packages included within the host OS 221), embodiments of the present disclosure provide for containerization of each of the packages that the host OS 221 includes in separate image files so as to allow for reduction of the container size necessary for an application to run, as discussed in further detail herein. As used herein, "containerization" may be defined as the process for generating an image file(s), thus containerization of a package may refer to generating an image file of that package while containerization of an operating system may refer to generating an image file for each of the operating system's packages. Referring also to FIG. 1A, the processing device 122 may execute the operating system containerization module 222A to perform one or more of the functions described herein. Although illustrated as a software module stored in memory 121 in FIG. 1A, in some embodiments the operating system containerization module 222A may be logic/functionality integrated into the container engine 222 or logic within processing device 122.

The container engine 222 may also include a software package manager (not shown) that interfaces with repositories in the registry server 130 to search for packages, as well as install, update, and remove packages on host OS 221. The software package manager may be any appropriate package management software such as Dandified Yum, for example. The software package manager may automatically compute dependencies of a package and determine any actions required to install a package. Each of the plurality of packages 223 may be in any appropriate format, such as the ".rpm" format, for example.

Figure 3B:
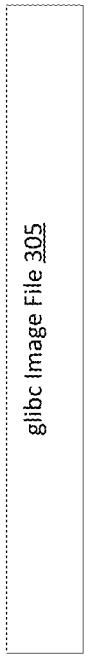
FIG. 3B is a diagram of an image file for a package, in accordance with some embodiments of the present disclosure.
Figure 3A:
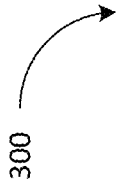
FIG. 3A is a diagram that illustrates the packages utilized by an operating system organized in a table by dependency level, in accordance with some embodiments of the present disclosure.

Each of the plurality of packages 223 may depend on one or more of the other packages in the plurality, and in turn each of the plurality of packages 223 may be depended on by one or more of the other packages in the plurality. Container engine 222 may perform a dependency analysis of the plurality of packages 223 that host OS 221 includes to determine a dependency level of each of the plurality of packages. The dependency level of a particular package may be defined as the number of packages that depend on that particular package. For example, a package on which a large number of other packages depend may be said to have a high dependency level while a package that is not depended on by a large number of packages may have a lower dependency level. Container engine 222 may analyze each package 223 one by one, and determine how many other packages are dependent on each package to determine the dependency level of each of the plurality of packages. In some embodiments, the dependency level of a particular package may be indicated by the number of other packages that depend on that particular package. Container engine 222 may sort the plurality of packages into a list, ordered beginning with the package having the highest dependency level to the package having the lowest. FIG. 3A illustrates a table 300 listing the plurality of packages 223 that host OS 221 includes, ordered from highest dependency level to lowest. As can be seen, 14713 packages depend from the "glibc package," which has the highest dependency level and is thus listed first. 5537 packages depend from the "bash" package, which has the second highest dependency level and is thus ordered second on the list 300. The last entry of table 300 is the "zlib" package, which has a dependency level of 2219 (i.e. 2219 packages depend from the "zlib" packages) and thus the lowest dependency level among packages in the plurality of packages.

Upon ordering the list of packages by dependency level, container engine 222 may containerize each of the plurality of packages sequentially, starting with the package having the highest dependency level (in the example of FIG. 3A, the "glibc" package) and moving sequentially down the list. Stated differently, container engine 222 may generate an image file for each of the plurality of packages sequentially starting with the "glibc" package, thereby resulting in a plurality of image files. Each of the plurality of image files may be generated in any appropriate format, such as the open container initiative (OCI) format or the copy on write (COW) format. Referring to FIG. 3B, container engine 222 may initially generate an image file 305 comprising the "glibc" package. The container engine 222 may use any appropriate method to generate the image file 305. For example, the container engine 222 may copy the libraries, binaries, and/or source files of the "glibc" package into an empty image. In another example, the container engine 222 may generate a dockerfile (that uses a pre-defined base image) and install the libraries, binaries, and/or source files of the "glibc" package to the dockerfile. The image file 305 may comprise all of the packages that the "glibc" package depends on as well as the libraries, binaries, and/or source files that the "glibc" package itself is comprised of. Because packages having higher dependency levels are those that have the largest number of other packages depending on them, the corresponding image file for those packages are likely to be reused when containerizing subsequent packages of the list 300. Thus, when generating an image file for a subsequent package in the list, container engine 222 may determine the packages that the subsequent package is dependent on, determine one or more previously imaged packages that (e.g., in combination) include at least some of those required packages and invoke the image file for those one or more previously imaged packages as base layers for the image file of the subsequent package.

For example, to generate image file 310 for the "zlib" package (referring to FIG. 3C), container engine 222 may determine a set of packages that the "zlib" package is dependent on. Container engine 222 may also determine that the image file 305 for the "glibc" package already includes all of the packages that the "zlib" package is dependent on (requires). Thus, container engine 222 may generate a first layer 310A comprising a link to the image file 305 for the "glibc" package and a second layer 310B comprising the libraries, binaries, and/or source files of the "zlib" package itself.

Similarly, when generating an image file (not shown) for the "bash" package, container engine 222 may determine a set of packages that the "bash" package is dependent on. Container engine 222 may also determine that the "glibc" package already includes most of the packages that the "bash" package is dependent on. Thus, container engine 222 may generate a first layer comprising a link to the image file 305 for the "glibc" package and a second layer comprising the libraries, binaries, and/or source files of the "bash" package itself and any remaining packages that the "bash" package is dependent on. It should be noted that although creating image files for each of the plurality of packages 223 in this way may result in a level of duplicity between the one or more of the plurality of image files, by creating image files starting with the packages having the highest dependency level, this duplicity may be minimized. Stated differently, by reusing the image file for packages having higher dependency levels, this duplicity may be minimized.

Upon generating an image file for each of the plurality of packages in the list 300, container engine 222 may upload the plurality of image files to a registry server (e.g., registry server 130 in FIG. 1A). The registry server may include a set of repositories (not shown), and each repository may include a collection of packages (and/or image files thereof) with metadata that tells the container engine 222 what the repository contains. When an application needs an image file to build on top of, the container engine 222 may determine one or more packages that the application requires (i.e., is dependent on), pull the image files corresponding to the required one or more packages from an appropriate repository within registry server 130, and layer them successively based on the dependency level of each of the required one or more packages along with the libraries and binaries etc. of the application itself to generate an application image file. In some embodiments, container engine 222 may determine which of the required one or more packages has the highest dependency level and use the image file corresponding to that package as the lowest level layer, and layer the remaining one or more required image files on top of the lowest level layer in descending order of dependency level. In some embodiments, the container engine 222 may optimize the build-up based on optimizing the amount of space consumed. Stated differently, when selecting packages that encompass the packages the application depends on, the container engine 222 may select packages so as to minimize the amount of storage required.

Figures 3C, 3D:
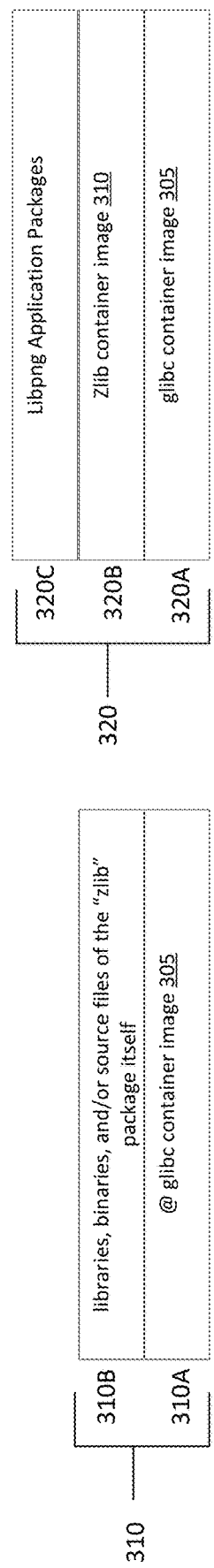
FIG. 3C is a diagram of an image file for a package, in accordance with some embodiments of the present disclosure.
FIG. 3D is a diagram of an image file for a container in which an application is to run, in accordance with some embodiments of the present disclosure.

For example, FIG. 3D illustrates an application image file 320 for deployment of an application called "libpng." Upon receiving a request to install the "libpng" application, container engine 222 may determine a set of packages that the "libpng" application is dependent on, and determine that the "glibc" and "zlib" packages already include all of the packages required by the "libpng" application. Thus, container engine 222 may retrieve the image files 305 and 310 from the registry server 130. Container engine 222 may then determine that "glibc" package has the highest dependency level and thus generate a first layer 320A comprising the image file 305 for the "glibc" package. Because the "zlib" package has a lower dependency level than the "glibc" package, container engine 222 may generate a second layer 320B comprising the image file 310 for the "zlib" package on top of the first layer 320A. Container engine 222 may generate a third layer 320C which comprises the application packages (e.g., the libraries, binaries, and/or source files) of the "libpng" application itself. Because the layers 320 B and C include actual package data for their corresponding packages and links to the image file(s) corresponding to packages that they depend on, no additional space is consumed. Stated differently, the size of image file 320 may correspond to the combined size of the "libpng" application package, the "zlib" package, and the "glibc" package.

In this way, image files corresponding to packages that are most frequently pulled via dependencies (e.g., because they are the most depended on/have the highest dependency level) are stored in lower level overlays of application image files. This results in a reduction in the overall container size required for large applications (since most of the lower level image files such the one corresponding to the "glibc" package are shared). This also allows security vulnerabilities in certain image files to be fixed more easily as there is a single point of failure. In the example of FIG. 3D, if the "glibc" image file 305 encounters a security vulnerability, then only that image file may need to be rebuilt, instead of all of the image files 305, 310, and 320 being rebuilt as a result of a security vulnerability in only one image file.

In some embodiments, it may be un-desirable to download a large number of image files from the registry. Thus, container engine 222 may squash each of the one or more image files corresponding to the required one or more packages into a single stand-alone image file (binary block).

In some embodiments, when building an application image file, the container engine 222 may determine the packages/image files to use for building the application image file based on a parameter that is set by a user. Stated differently, the container engine 222 may optimize the build of the application image file based on the parameter. The plurality of packages 223 may include packages corresponding to different desktop types, packages corresponding to different product types, and packages corresponding to different languages. Thus, a user may specify the parameter as a desktop type (e.g., GNOME, MATE), a product type (e.g., Kubernetes-1.11, Kubernetes-1.12, perl-2.14, perl-5, ubi8), or a language type (e.g., all languages, English) for example. When building the application image file, the container engine 222 may select packages corresponding to the selected parameter. For example, if the user indicates that the Kubernetes-1.12 orchestration system is being used, container engine 222 may build the application image file using packages that are optimized for Kubernetes-1.12. Alternatively, if the user indicates that the GNOME desktop is being used, container engine 222 may build the application image file using packages that are optimized for the GNOME desktop.

Figure 4:
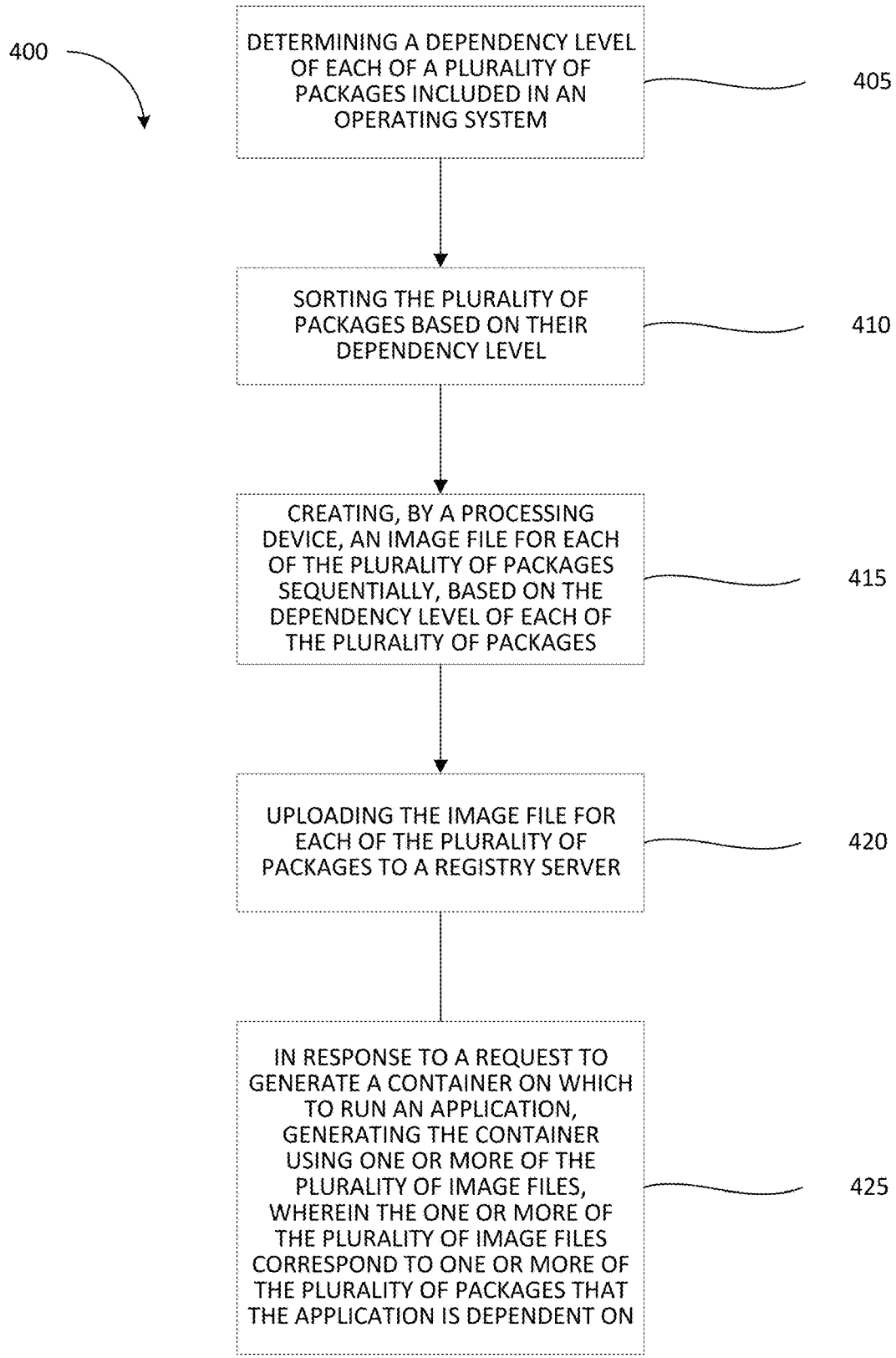
FIG. 4 is a flow diagram of a method of containerizing the packages utilized by an operating system, in accordance with some embodiments of the present disclosure.

FIG. 4 is a flow diagram of a method 400 of containerizing the packages of an operating system, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIG. 1A).

Referring simultaneously to FIGS. 1A and 1B, the method 400 begins at block 405, where container engine 222 may perform a dependency analysis of the plurality of packages 223 that host OS 221 is comprised of to determine a dependency level of each of the plurality of packages. The dependency level of a particular package may be defined as the number of packages that depend on that particular package. For example, a package on which a large number of other packages depend may be said to have a high dependency level while a package that is not depended on by a large number of packages may have a lower dependency level. Container engine 222 may analyze each package one by one, and determine how many other packages are dependent on each package to determine the dependency level of each of the plurality of packages. In some embodiments, the dependency level of a particular package may be indicated by the number of other packages that depend on that particular package. At block 410, container engine 222 may sort the plurality of packages into a list, ordered beginning with the package having the highest dependency level to the package having the lowest. FIG. 3A illustrates a table 300 listing the plurality of packages that host OS 221 includes, ordered from highest dependency level to lowest.

At block 415, container engine 222 may containerize each of the plurality of packages sequentially, starting with the package having the highest dependency level (in the example of FIG. 3A, the "glibc" package) and moving sequentially down the list. Stated differently, container engine 222 may generate an image file for each of the plurality of packages sequentially starting with the "glibc" package, thereby resulting in a plurality of image files. Each of the plurality of image files may be generated in any appropriate format, such as the open container initiative (OCI) format or the copy on write (COW) format.

Upon generating an image file for each of the plurality of packages in the list 300, at block 420, container engine 222 may upload the plurality of image files to a registry server (e.g., registry server 130 in FIG. 1A). The registry server may include a set of repositories (not shown), and each repository may include a collection of packages (and/or image files thereof) with metadata that tells the container engine 222 what the repository contains. At block 425, when an application needs an image file to build on top of, the container engine 222 may determine one or more packages that the application requires (i.e., is dependent on), pull the image files corresponding to the required one or more packages from an appropriate repository within registry server 130, and layer them based on the dependency level of each of the required one or more packages. In some embodiments, container engine 222 may determine which of the required one or more packages has the highest dependency level and use the image file corresponding to that package as the base image, and layer the remaining one or more required image files on top of the base image in descending order of dependency level.

In some embodiments, it may be un-desirable to download a large number of image files from the registry. Thus, container engine 222 may squash each of the one or more image files corresponding to the required one or more packages into a single stand-alone image file (binary block).

In some embodiments, when building an application image file, the container engine 222 may determine the packages/image files to use for building the application image file based on a certain parameter that is set by a user. Stated differently, the container engine 222 may optimize the build of the application image file based on the parameter. The plurality of packages 223 may include packages corresponding to different desktop types, packages corresponding to different product types, and packages corresponding to different languages. Thus, a user may specify the parameter as a desktop type (e.g., GNOME, MATE), a product type (e.g., Kubernetes-1.11, Kubernetes-1.12, perl-2.14, perl-5, ubi8), or a language type (e.g., all languages, English) for example. When building the application image file, the container engine 222 may select packages corresponding to the selected parameter. For example, if the user indicates that the Kubernetes-1.12 orchestration system is being used, container engine 222 may build the application image file using packages that are optimized for Kubernetes-1.12. Alternatively, if the user indicates that the GNOME desktop is being used, container engine 222 may build the application image file using packages that are optimized for the GNOME desktop.

Figure 5:
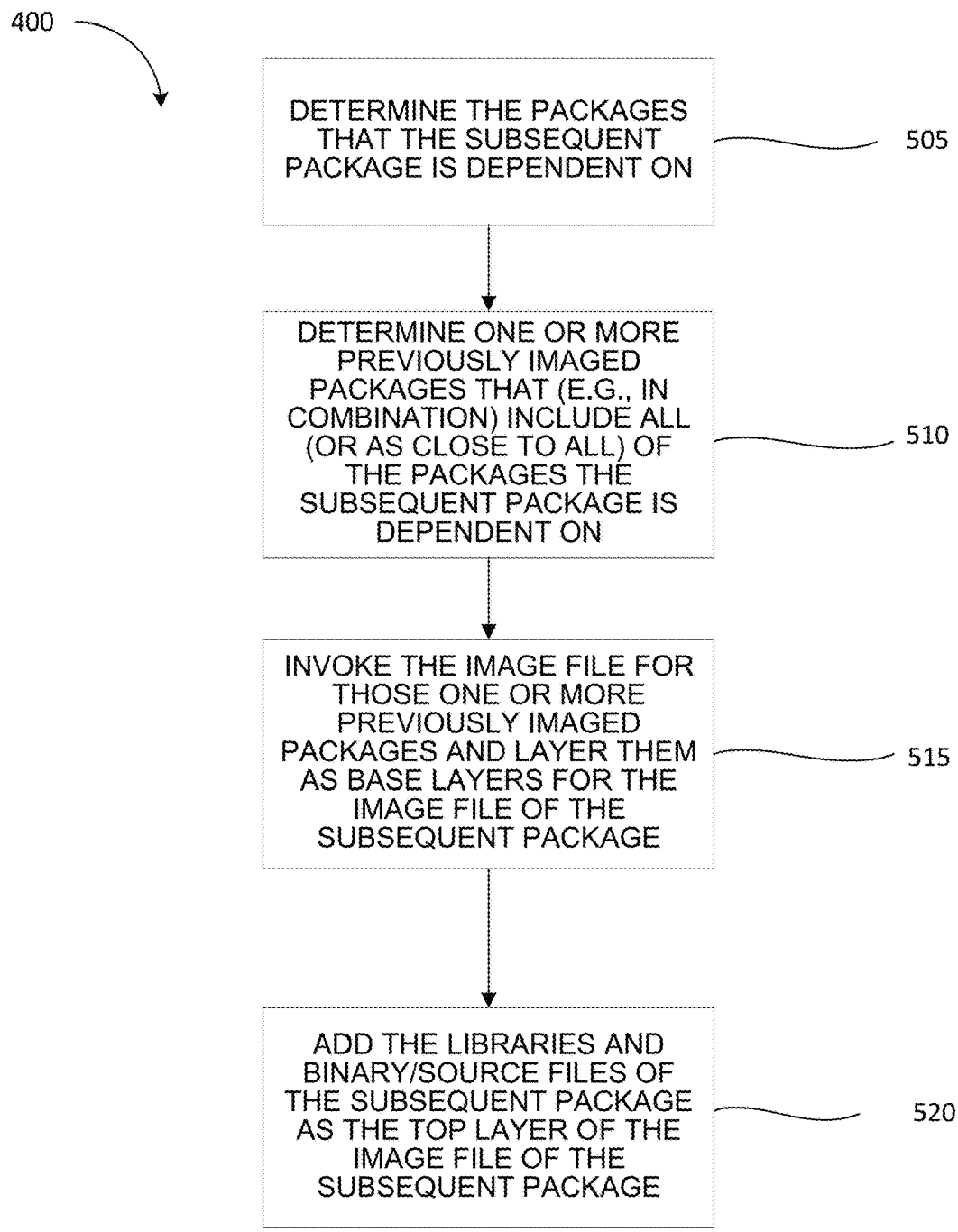
FIG. 5 is a flow diagram of a method of generating an image file for a package, in accordance with some embodiments of the present disclosure.

FIG. 5 is a flow diagram of a method 500 of generating an image file for a package, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120 illustrated in FIG. 1A).

As discussed above, container engine 222 may generate an image file for each of the plurality of packages sequentially starting with the "glibc" package, thereby resulting in a plurality of image files. Each of the plurality of image files may be generated in any appropriate format, such as the open container initiative (OCI) format or the copy on write (COW) format. Referring to FIG. 3B, container engine 222 may initially generate an image file 305 comprising the "glibc" package. The container engine 222 may use any appropriate method to generate the image file 305. For example, the container engine 222 may copy the libraries, binaries, and/or source files of the "glibc" package into an empty image. In another example, the container engine 222 may generate a dockerfile (that uses a pre-defined base image) and install the libraries, binaries, and/or source files of the "glibc" package to the dockerfile. The image file 305 may comprise all of the packages that the "glibc" package depends on as well as the libraries, binaries, and/or source files that the "glibc" package itself is comprised of. Because packages having higher dependency levels are those that have the largest number of other packages depending on them, the corresponding image file for those packages are likely to be reused when containerizing subsequent packages of the list 300. Thus, at block 505, when generating an image file for a subsequent package in the list, container engine 222 may determine the packages that the subsequent package is dependent on, and at block 510 determine one or more previously imaged packages that (e.g., in combination) include all (or as close to all) of the packages the subsequent package is dependent on. At block 515, the container engine 222 may invoke the image file for those one or more previously imaged packages and layer them as base layers for the image file of the subsequent package. At block 520, the libraries and binary/source files of the subsequent package may be added as the top layer of the image file of the subsequent package.

For example, to generate image file 310 for the "zlib" package (referring to FIG. 3C), container engine 222 may determine a set of packages that the "zlib" package is dependent on. Container engine 222 may also determine that the image file 305 for the "glibc" package already includes all of the packages that the "zlib" package is dependent on (requires). Thus, container engine 222 may generate a first layer 310A comprising a link to the image file 305 for the "glibc" package and a second layer 310B comprising the libraries, binaries, and/or source files of the "zlib" package itself.

Similarly, when generating an image file (not shown) for the "bash" package, container engine 222 may determine a set of packages that the "bash" package is dependent on. Container engine 222 may also determine that the "glibc" package already includes most of the packages that the "bash" package is dependent on. Thus, container engine 222 may generate a first layer comprising a link to the image file 305 for the "glibc" package and a second layer comprising the libraries, binaries, and/or source files of the "bash" package itself and any remaining packages that the "bash" package is dependent on. It should be noted that although creating image files for each of the plurality of packages in this way may result in a level of duplicity between the one or more of the plurality of image files, by creating image files starting with the packages having the highest dependency level, this duplicity may be minimized. Stated differently, by reusing the image file for packages having higher dependency levels, this duplicity may be minimized.

Figure 6:
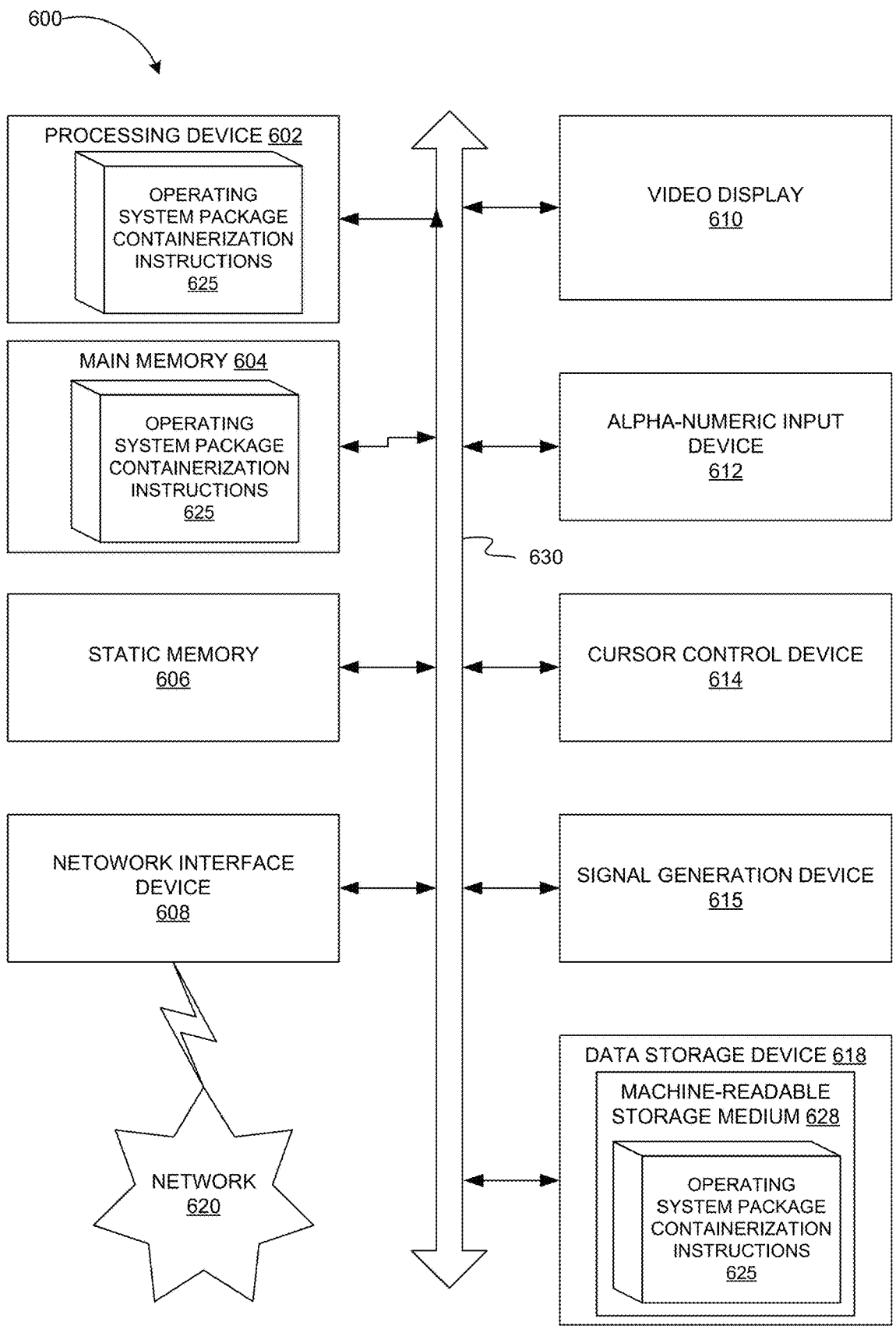
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for containerizing the packages of an operating system. More specifically, the machine may determine a dependency level of each of a plurality of packages included in an operating system, sort the plurality of packages based on their dependency level, create an image file for each of the plurality of packages sequentially, based on the dependency level of each of the plurality of packages, upload the image file for each of the plurality of packages to a repository, and in response to a request to generate a container on which to run an application, generate the container using one or more of the plurality of image files, wherein the one or more of the plurality of image files correspond to one or more of the plurality of packages that the application is dependent on.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute in-memory migration instructions 625, for performing the operations and steps discussed herein.

The data storage device 618 may include a machine-readable storage medium 628, on which is stored one or more sets of operating system package containerization instructions 625 (e.g., software) embodying any one or more of the methodologies of functions described herein. The operating system package containerization instructions 625 may also reside, completely or at least partially, within the main memory 604 or within the processing device 602 during execution thereof by the computer system 600; the main memory 604 and the processing device 602 also constituting machine-readable storage media. The operating system package containerization instructions 625 may further be transmitted or received over a network 620 via the network interface device 608.

The machine-readable storage medium 628 may also be used to store instructions to perform a method for object analysis/validation event publishing, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: determining a dependency level of each of a plurality of packages included in an operating system, sorting the plurality of packages based on their dependency level, creating, by a processing device, an image file for each of the plurality of packages sequentially, based on the dependency level of each of the plurality of packages, uploading the image file for each of the plurality of packages to a repository; and in response to a request to generate a container on which to run an application, generating the container using one or more of the plurality of image files, wherein the one or more of the plurality of image files correspond to one or more of the plurality of packages that the application is dependent on.

Example 2 is the method of example 1, wherein generating the container comprises: determining the one or more of the plurality of packages that the application is dependent on; retrieving from the repository, a corresponding image file for each of the one or more packages that the application is dependent on; and layering the one or more of the plurality of image files corresponding to the one or more packages that the application is dependent on to generate an application image file.

Example 3 is the method of example 2, wherein layering the one or more of the plurality of image files comprises layering the one or more image files successively based on the dependency levels of the one or more packages that the application is dependent on.

Example 4 is the method of example 2, further comprising squashing the one or more of the plurality of image files into a single image file.

Example 5 is the method of example 1, wherein creating an image file for a package comprises: determining whether any packages for which an image file was previously created satisfies a dependency requirement for the package, and in response to determining a set of packages for which image files were previously created and that satisfy the dependency requirement for the current package: layering the image files corresponding to the set of packages for which image files were previously created, and adding the package to a subsequent layer of the image file.

Example 6 is the method of example 1, wherein creating an image file for each of the plurality of packages sequentially comprises creating the image file for each of the plurality of packages sequentially in descending order of the dependency level of each of the plurality of packages.

Example 7 is the method of example 1, further comprising: in response to detecting removal of a package from the plurality of packages: determining the dependency level of each of the plurality of packages included in the operating system, sorting the plurality of packages based on their dependency level, creating a new image file for each of the plurality of packages sequentially, based on the dependency level of each package, uploading the new image file for each of the plurality of packages to the repository, and in response to a subsequent request to generate a subsequent container on which to run a subsequent application, generating the subsequent container using one or more of the plurality of new image files, wherein the one or more of the plurality of new image files correspond to one or more of the plurality of packages that the subsequent application depends on.

Example 8 is a system comprising: a memory, and a processing device operatively coupled to the memory, the processing device to: determine a dependency level of each of a plurality of packages included in an operating system, sort the plurality of packages based on their dependency level, create an image file for each of the plurality of packages sequentially, based on the dependency level of each of the plurality of packages, upload the image file for each of the plurality of packages to a repository, and in response to a request to generate a container on which to run an application, receive a parameter which an application image file is to be optimized for, wherein the container is to run on the application image file, determine one or more of the plurality of packages that the application is dependent on based on the parameter, and generate the application image file using the application and one or more of the plurality of image files, wherein the one or more of the plurality of image files correspond to the one or more packages that the application is dependent on.

Example 9 is the system of example 8, wherein the parameter comprises one of: a language, a desktop, or a container orchestration system used by the operating system.

Example 10 is the system of example 8, wherein to generate the application image file, the processing device is to layer the one or more image files successively.

Example 11 is the system of example 10, wherein to generate the application image file, the processing device is further to layer the one or more image files successively based on the dependency levels of the one or more packages that the application is dependent on.

Example 12 is the system of example 10, wherein the processing device is further to squash the one or more of the plurality of image files into a single image file.

Example 13 is the system of example 8, wherein to create an image file for a package the processing device is to: determine whether any packages for which an image file was previously created satisfies a dependency requirement for the package, and in response to determining a set of packages for which image files were previously created and that satisfy the dependency requirement for the current package: layer the image files corresponding to the set of packages for which image files were previously created, and add the package to a subsequent layer of the image file.

Example 14 is the system of example 8, wherein to create an image file for each of the plurality of packages sequentially the processing device is to create the image file for each of the plurality of packages sequentially in descending order of the dependency level of each of the plurality of packages.

Example 15 is a non-transitory computer readable storage medium, having instructions stored thereon that, when executed by a processing device, cause the processing device to: determine a dependency level of each of a plurality of packages included in an operating system, sort the plurality of packages based on their dependency level, create an image file for each of the plurality of packages sequentially, based on the dependency level of each of the plurality of packages, upload the image file for each of the plurality of packages to a repository, and in response to a request to generate a container on which to run an application, generate the container using one or more of the plurality of image files, wherein the one or more of the plurality of image files correspond to one or more of the plurality of packages that the application is dependent on.

Example 16 is the non-transitory computer readable storage medium of example 15, wherein to generate the container, the processing device is to: determine the one or more of the plurality of packages that the application is dependent on, retrieve from the repository, a corresponding image file for each of the one or more packages that the application is dependent on; and layer the one or more of the plurality of image files corresponding to the one or more packages that the application is dependent on to generate an application image file.

Example 17 is the non-transitory computer readable storage medium of example 16, wherein to layer the one or more of the plurality of image files, the processing device is to layer the one or more image files successively based on the dependency levels of the one or more packages that the application is dependent on.

Example 18 is the non-transitory computer readable storage medium of example 16, wherein the processing device is further to squash the one or more of the plurality of image files into a single image file.

Example 19 is the non-transitory computer readable storage medium of example 15, wherein to create an image file for a package the processing device is to: determine whether any packages for which an image file was previously created satisfies a dependency requirement for the package, and in response to determining a set of packages for which image files were previously created and that satisfy the dependency requirement for the current package: layer the image files corresponding to the set of packages for which image files were previously created, and add the package to a subsequent layer of the image file.

Example 20 is the non-transitory computer readable storage medium of example 15, wherein to create an image file for each of the plurality of packages sequentially the processing device is to create the image file for each of the plurality of packages sequentially in descending order of the dependency level of each of the plurality of packages.

Example 21 is the non-transitory computer readable storage medium of example 15, wherein the processing device is further to: in response to detecting removal of a package from the plurality of packages: determine the dependency level of each of the plurality of packages included in the operating system, sort the plurality of packages based on their dependency level, create a new image file for each of the plurality of packages sequentially, based on the dependency level of each package, upload the new image file for each of the plurality of packages to the repository, and in response to a subsequent request to generate a subsequent container on which to run a subsequent application, generate the subsequent container using one or more of the plurality of new image files, wherein the one or more of the plurality of new image files correspond to one or more of the plurality of packages that the subsequent application depends on.

Example 22 is a method comprising: determining a dependency level of each of a plurality of packages included in an operating system, sorting the plurality of packages based on their dependency level, creating, by a processing device, an image file for each of the plurality of packages sequentially, based on the dependency level of each of the plurality of packages, uploading the image file for each of the plurality of packages to a repository, and in response to a request to generate a container on which to run an application: receiving a parameter which an application image file is to be optimized for, wherein the container is to run on the application image file, determining one or more of the plurality of packages that the application is dependent on based on the parameter, and generating the application image file using the application and one or more of the plurality of image files, wherein the one or more of the plurality of image files correspond to the one or more packages that the application is dependent on.

Example 23 is the method of example 22, wherein the parameter comprises one of: a language, a desktop, or a container orchestration system used by the operating system.

Example 24 is the method of example 22, wherein generating the application image file comprises layering the one or more image files successively based on the dependency levels of the one or more packages that the application is dependent on.

Example 25 is the method of example 24, further comprising squashing the one or more of the plurality of image files into a single image file.

Example 26 is the method of example 22, wherein creating an image file for a package comprises: determining whether any packages for which an image file was previously created satisfies a dependency requirement for the package, and in response to determining a set of packages for which image files were previously created and that satisfy the dependency requirement for the current package: layering the image files corresponding to the set of packages for which image files were previously created, and adding the package to a subsequent layer of the image file.

Example 27 is the method of example 22, wherein creating an image file for each of the plurality of packages sequentially comprises creating the image file for each of the plurality of packages sequentially in descending order of the dependency level of each of the plurality of packages.

Example 28 is a system comprising: a memory; and a processing device operatively coupled to the memory, the processing device to: determine a dependency level of each of a plurality of packages included in an operating system, sort the plurality of packages based on their dependency level, create an image file for each of the plurality of packages sequentially, based on the dependency level of each of the plurality of packages, upload the image file for each of the plurality of packages to a repository, and in response to a request to generate a container on which to run an application, generate the container using one or more of the plurality of image files, wherein the one or more of the plurality of image files correspond to one or more of the plurality of packages that the application is dependent on.

Example 29 is the system of example 28, wherein to generate the container, the processing device is to: determine the one or more of the plurality of packages that the application is dependent on, retrieve from the repository, a corresponding image file for each of the one or more packages that the application is dependent on; and layer the one or more of the plurality of image files corresponding to the one or more packages that the application is dependent on to generate an application image file.

Example 30 is the system of example 28, wherein to generate the container, the processing device is further to layer the one or more image files successively based on the dependency levels of the one or more packages that the application is dependent on.

Example 31 is the system of example 30, wherein the processing device is further to squash the one or more of the plurality of image files into a single image file.

Example 32 is the system of example 28, wherein to create an image file for a package the processing device is to: determine whether any packages for which an image file was previously created satisfies a dependency requirement for the package, and in response to determining a set of packages for which image files were previously created and that satisfy the dependency requirement for the current package: layer the image files corresponding to the set of packages for which image files were previously created, and add the package to a subsequent layer of the image file.

Example 33 is the system of example 28, wherein to create an image file for each of the plurality of packages sequentially the processing device is to create the image file for each of the plurality of packages sequentially in descending order of the dependency level of each of the plurality of packages.

Example 34 is the system of example 28, wherein the processing device is further to: in response to detecting removal of a package from the plurality of packages: determine the dependency level of each of the plurality of packages included in the operating system, sort the plurality of packages based on their dependency level, create a new image file for each of the plurality of packages sequentially, based on the dependency level of each package, upload the new image file for each of the plurality of packages to the repository, and in response to a subsequent request to generate a subsequent container on which to run a subsequent application, generate the subsequent container using one or more of the plurality of new image files, wherein the one or more of the plurality of new image files correspond to one or more of the plurality of packages that the subsequent application depends on.

Example 35 is an apparatus comprising: means for determining a dependency level of each of a plurality of packages included in an operating system, means for sorting the plurality of packages based on their dependency level, means for creating an image file for each of the plurality of packages sequentially, based on the dependency level of each of the plurality of packages, means for uploading the image file for each of the plurality of packages to a repository, and means for, responsive to a request to generate a container on which to run an application, generating the container using one or more of the plurality of image files, wherein the one or more of the plurality of image files correspond to one or more of the plurality of packages that the application is dependent on.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
    determining a dependency level of each of a plurality of packages included in an operating system, wherein the dependency level of a particular package in the plurality of packages indicates a count of how many other packages in the plurality of packages depend on the particular package, and wherein a first package with a highest non-zero count is determined to have a highest dependency level and a second package having a second highest non-zero count is determined to have a second highest dependency level;
    generating an image file for each of the plurality of packages to generate a plurality of image files sequentially in order of the dependency levels, wherein a first image file generated for the first package is used as a base image for a second image file to be generated for the second package; and
    generating, by a processing device, a container comprising layers by:
        using the first image file corresponding to the first package having the highest dependency level as a lowest layer of the container; and
        arranging, on top of the lowest layer of the container, one or more of the plurality of image files corresponding to one or more remaining packages of the plurality of packages in descending order of their dependency levels.

2. The method of claim 1, further comprising:
    uploading the plurality of image files for each of the plurality of packages to a registry server.

3. The method of claim 1, wherein creating the image file for each of the plurality of packages sequentially comprises creating the image file for each of the plurality of packages sequentially in descending order of the dependency levels of each of the plurality of packages.

4. The method of claim 1, wherein generating the container further comprises:
    determining one or more of the plurality of packages that an application is dependent on;
    retrieving from a registry server, a corresponding image file for each of the one or more packages that the application is dependent on; and
    layering the one or more of the plurality of image files corresponding to the one or more packages that the application is dependent on to generate an application image file.

5. The method of claim 4, wherein layering the one or more of the plurality of image files comprises layering the one or more image files successively based on the dependency levels of the one or more packages that the application is dependent on.

6. A system comprising:
    a memory; and
    a processing device operatively coupled to the memory, the processing device to:
    determine a dependency level of each of a plurality of packages included in an operating system, wherein the dependency level of a particular package in the plurality of packages indicates a count of how many other packages in the plurality of packages depend on the particular package, and wherein a first package with a highest non-zero count is determined to have a highest dependency level and a second package having a second highest non-zero count is determined to have a second highest dependency level;
    generating an image file for each of the plurality of packages to generate a plurality of image files sequentially in order of the dependency levels, wherein a first image file generated for the first package is used as a base image for a second image file to be generated for the second package; and
    generate a container comprising layers, wherein to generate the container, the processing device to:
        use the first image file corresponding to the first package having the highest dependency level as a lowest layer of the container; and
        arrange, on top of the lowest layer of the container, one or more of the plurality of image files corresponding to one or more remaining packages of the plurality of packages in descending order of their dependency levels.

7. The system of claim 6, wherein the processing device, in response to a request to generate the container on which to run an application, to:
    receive a parameter which an application image file is to be optimized for, wherein the container is to run on the application image file;
    determine one or more of the plurality of packages that the application is dependent on based on the parameter; and
    generate the application image file using the application and one or more of the plurality of image files, wherein the one or more of the plurality of image files correspond to the one or more packages that the application is dependent on.

8. The system of claim 7, wherein the parameter comprises one of: a language, a desktop, or a container orchestration system used by the operating system.

9. The system of claim 7, wherein to generate the application image file, the processing device is to layer the one or more image files successively.

10. The system of claim 9, wherein to generate the application image file, the processing device is further to layer the one or more image files successively based on the dependency levels of the one or more packages that the application is dependent on.

11. The system of claim 9, wherein the processing device is further to squash the one or more of the plurality of image files into a single image file.

12. The system of claim 7, wherein to create an image file for a current package the processing device is to:

determine whether any packages for which an image file was previously created satisfies a dependency requirement for the current package; and in response to determining a set of packages for which image files were previously created and that satisfy the dependency requirement for the current package:

layer the image files corresponding to the set of packages for which image files were previously created; and add the current package to a subsequent layer of the image file.

13. The system of claim 7, wherein to create the image file for each of the plurality of packages sequentially, the processing device is to create the image file for each of the plurality of packages sequentially in descending order of the dependency level of each of the plurality of packages.

14. A non-transitory computer-readable medium, having instructions stored thereon that, when executed by a processing device, cause the processing device to:

determine a dependency level of each of a plurality of packages included in an operating system, wherein the dependency level of a particular package in the plurality of packages indicates count of how many other packages in the plurality of packages depend on the particular package, and wherein a first package with a highest non-zero count is determined to have a highest dependency level and a second package having a second highest non-zero count is determined to have a second highest dependency level;

generate, by the processing device, a container comprising layers, wherein to generate the container, the processing device to:

use the first image file corresponding to the first package having the highest dependency level as a lowest layer of the container; and arrange, on top of the lowest layer of the container, one or more of the plurality of image files corresponding to one or more remaining packages of the plurality of packages in descending order of their dependency levels.

15. The non-transitory computer-readable medium of claim 14, wherein the processing device further to:

upload the image file for each of the plurality of packages to a registry server.

16. The non-transitory computer-readable medium of claim 15, wherein to generate the container, the processing device is to:

determine the one or more of the plurality of packages that an application is dependent on;

retrieve from the registry server, a corresponding image file for each of the one or more packages that the application is dependent on; and layer the one or more of the plurality of image files corresponding to the one or more packages that the application is dependent on to generate an application image file.

17. The non-transitory computer-readable medium of claim 16, wherein to layer the one or more of the plurality of image files, the processing device is to layer the one or more image files successively based on the dependency levels of the one or more packages that the application is dependent on.

18. The non-transitory computer-readable medium of claim 14, wherein the processing device is further to squash the one or more of the plurality of image files into a single image file.

* * * * *